(12) United States Patent
Moretti et al.

(10) Patent No.: US 7,282,908 B2
(45) Date of Patent: Oct. 16, 2007

(54) SURVEYING DEVICE FOR THE RUNNING PARAMETERS OF RAILWAY BEARINGS

(75) Inventors: Roberto Moretti, Cambiano (IT); Matteo Genero, Santena (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/174,196

(22) Filed: Jun. 17, 2002

(65) Prior Publication Data

US 2003/0231014 A1 Dec. 18, 2003

(51) Int. Cl.
*G01B 7/30* (2006.01)

(52) U.S. Cl. .................. 324/174; 324/207.25; 384/448

(58) Field of Classification Search ............ 324/207.2, 324/207.21, 207.15, 207.22, 207.25, 174; 384/448; 341/15
See application file for complete search history.

(56) References Cited

U.S. PATENT DOCUMENTS

| 4,864,231 | A | * | 9/1989 | Okumura et al. ........... 324/173 |
| 4,946,296 | A | | 8/1990 | Olschewski et al. |
| 4,988,219 | A | * | 1/1991 | Peilloud .................... 384/448 |
| 5,184,069 | A | | 2/1993 | Adler et al. |
| 5,261,752 | A | | 11/1993 | Ouchi et al. |
| 5,289,120 | A | * | 2/1994 | Moretti et al. .............. 324/174 |
| 5,372,435 | A | * | 12/1994 | Genero et al. ............. 384/448 |
| 5,611,545 | A | | 3/1997 | Nicot |
| 5,873,658 | A | | 2/1999 | Message et al. |
| 5,947,611 | A | * | 9/1999 | Nagase ....................... 384/448 |
| 5,969,518 | A | * | 10/1999 | Merklein et al. ........... 324/173 |
| 6,179,471 | B1 | | 1/2001 | Moretti et al. |
| 6,343,878 | B1 | * | 2/2002 | Ouchi ........................ 384/448 |
| 6,605,938 | B1 | * | 8/2003 | Sentoku et al. ............. 324/174 |
| 6,637,754 | B1 | * | 10/2003 | Ohtsuki et al. ............. 277/549 |
| 6,682,076 | B1 | * | 1/2004 | Hosoda et al. .............. 277/402 |
| 6,943,542 | B2 | * | 9/2005 | Sentoku et al. ............. 324/174 |
| 7,034,521 | B2 | * | 4/2006 | Sentoku et al. ............. 324/174 |
| 2002/0125882 | A1 | * | 9/2002 | Foster et al. ................ 324/174 |
| 2003/0048164 | A1 | * | 3/2003 | Sentoku ..................... 335/306 |
| 2006/0119349 | A1 | * | 6/2006 | Sentoku et al. ............. 324/174 |

FOREIGN PATENT DOCUMENTS

| DE | 4312424 | 4/1993 |
| EP | 0438624 | 3/1990 |
| EP | 0464403 | 6/1991 |
| EP | 0657738 | 8/1994 |

* cited by examiner

*Primary Examiner*—Jay M Patidar
(74) *Attorney, Agent, or Firm*—Merchant & Gould P.C.

(57) ABSTRACT

Surveying device (1) for the running parameters of railway contact bearings (2) which is provided with a rotating race (3) and a non-rotating race (4) which are coaxial to a rotation axis (A) of the railway contact bearing (2) itself, the device (1) being provided with a sealing shield (5) which is mounted onto the non-rotating race (4); and which is also provided with a sealing lining/covering (7) which is integral with the shield (5), and which is in contact with a sliding surface (11*s*) which is in turn integral with the rotating race (3): the device also being provided with a signal generating element (15) which is integral with the sliding surfaces (3*s*) (11*s*) themselves and which is arranged inside the shield (5); and which is also provided with a sensor (16), which faces the generating element (15) in order to read the signal itself, and which is itself integral with the shield (5) in a position which is outside the railway bearing (2).

33 Claims, 5 Drawing Sheets

SURVEYING DEVICE FOR THE RUNNING PARAMETERS OF RAILWAY BEARINGS

The present invention relates to a surveying device for the running parameters of railway bearings.

The Italian patent Application No. T096A000752 describes a surveying device for the rotation speed applied to a bearing for railway axles, and it comprises a magnetic wheel which generates impulses; a sensor which faces the magnetic wheel in order to receive the impulses; two sealing shields which are mounted onto a rotating race and a non-rotating race of the bearing, and which, respectively, support the magnetic wheel and the sensor.

The aim of the present invention is to produce a surveying device for the running parameters of railway bearings, which presents better sealing qualities than those presented by the device described in the above-mentioned patent application, and which is also defined by a reduced number of components, so that it is both simple and cost-effective to manufacture.

According to the present invention, a surveying device for the running parameters of railway bearing will be produced which is provided with a rotating race and a non-rotating race of the railway bearing itself, the device comprising:
- a sealing shield which is mounted on the non-rotating race;
- a sealing covering which is integral with the shield and which is in contact with a sliding surface which is integral with the rotating race;
- a signal generating element which is integral with the sliding surface itself and which is arranged outside the shield; and
- a sensor, which faces the generating element in order to read the signal itself, and which sensor itself is also integral with the shield in a position which is outside the railway bearing.

The present invention will now be described with reference t the attached drawings, which illustrate a non-limiting form of embodiment of the present invention and in which.

Figure 1:
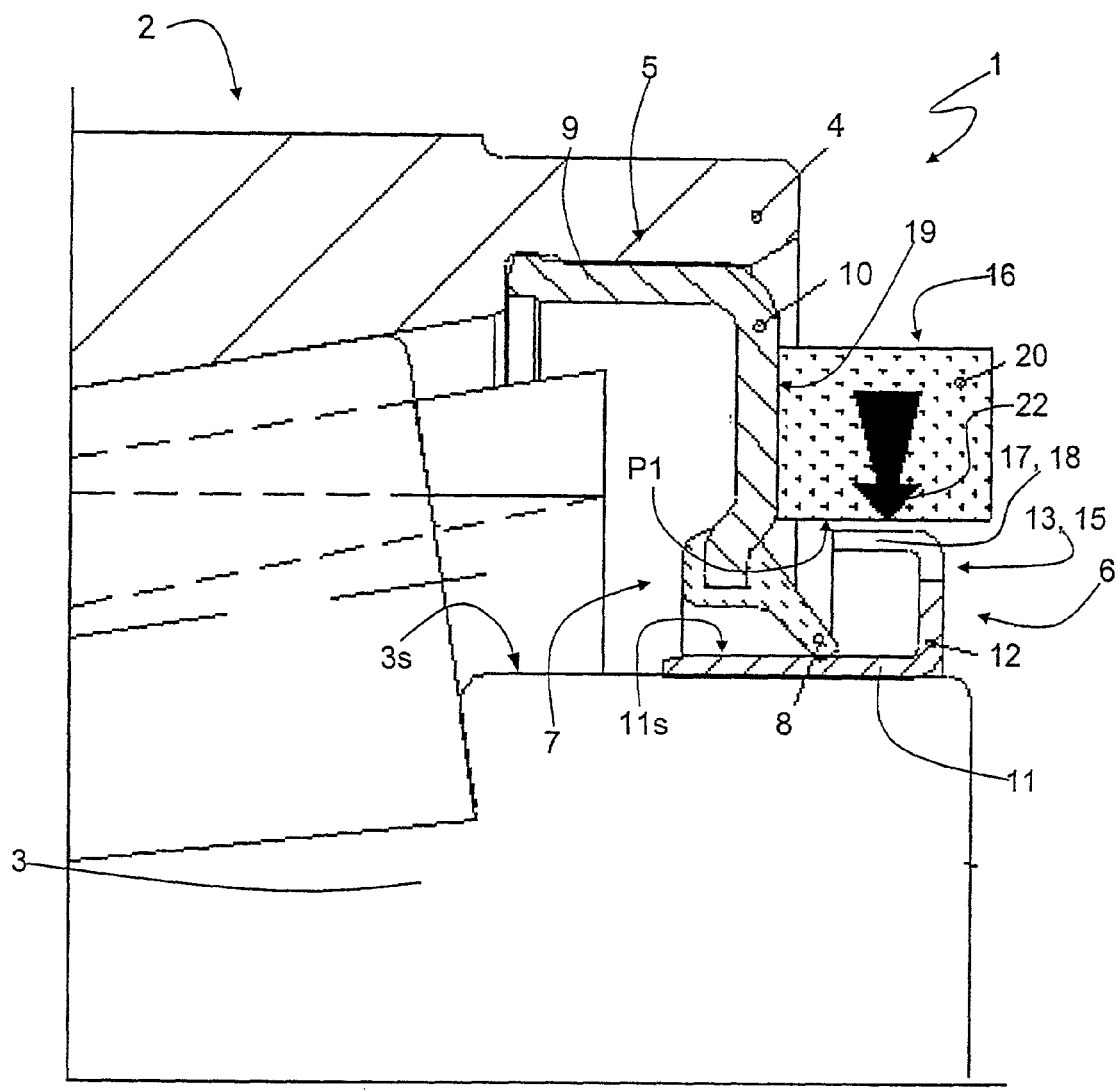
FIG. 1 is an axial section view, with some parts removed for reasons of clarity, of a preferred form of embodiment of a surveying device for the running parameters of railway bearings produced according to the present invention.

With reference to FIG. 1, the number 1 indicates, in its entirety, a surveying device for the running parameters of a railway bearing 2, shown as a tapered roller bearing, which comprises a rotating race 3 and a non-rotating race 4 which are coaxial to each other and to a rotation axis A (FIG. 3) of the railway bearing 2 itself.

The device 1 comprises a sealing shield 5 which is mounted onto the non-rotating race 4, an annular element 6 which is mounted onto the rotating race 3, and a sealing covering 7 which is integral with the shield 5 and which is provided with a lip 8 which his turned towards the element 6.

In particular, in an axial section which is intended as a section obtained by means of a passing plane for the axis A and for any diameter of the railway bearing 2, the shield 5 presents a shape which is substantially in the form of an L, and comprises a cylindrical wall 9 which is mounted inside and in contact with the non-rotating race 4, and an annular wall 10, which extends transversally to the axis A between the two races 3 and 4 starting from the wall 9 towards the race 3, and which supports the covering 7 in correspondence with one of its own internal radial free ends.

The element 6 comprises a cylindrical wall 11, which is shrink fit onto an internal radial surface 3s of the race 3, and which is radially delimited towards the inside by a cylindrical surface 11s which is arranged in sliding contact with the lip 8. The element 6 also comprises an annular wall 12, which is transverse to the axis A and is axially staggered towards the outside of the railway bearing 2 in relation to the wall 10, and a further cylindrical wall 13, which is integral with the wall 12, and which extends transversally to the wall 12 itself towards the shield 5 while overlapping the surface 11s in an axial direction.

The device 1 also comprises a signal generating element 15, and a sensor 16 which faces the signal generating element 15 in order to read the signal itself.

The signal generating element 15 is defined by a phonic wheel which is obtained directly on the wall 13 by alternating a number of teeth 17 and a number of notches 18 in relation to each other, the rotation of which around the axis A, together with the rotating race 3 of the railway bearing 2, turns the wall 13 into an emission wall which emits a signal which is captured by the sensor 16. As an alternative to the teeth 17 and the notches 18, it is possible to provide a number of magnetised areas which have alternating magnetic fields: the effect on the sensor 16 is, however identical, as both the teeth 17 and the positively magnetised areas can be considered to be the equivalent of positive poles, and both the notches 18 and the negatively magnetised areas can be considered to be the equivalent of negative poles or vice versa.

Figure 2:
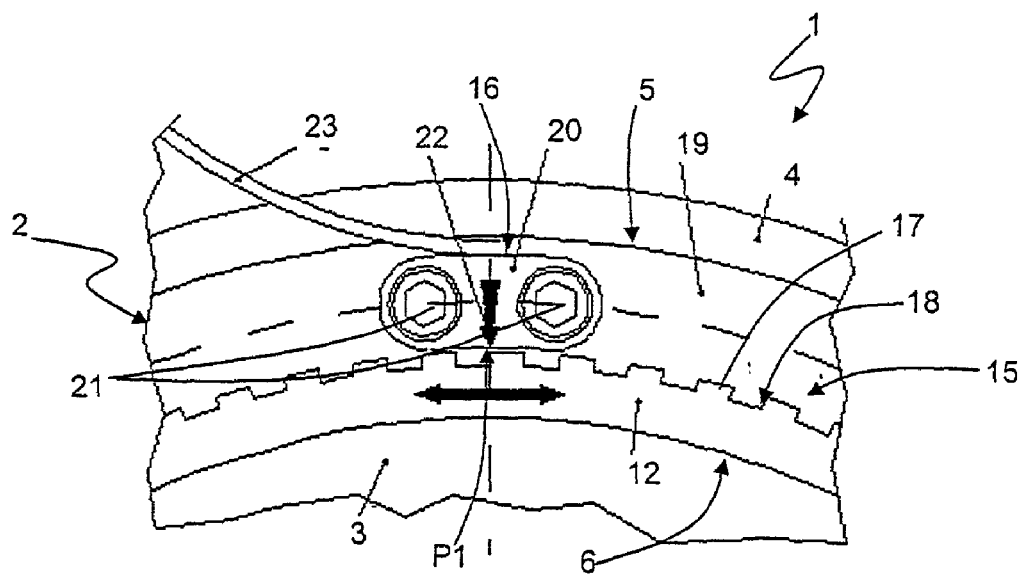
FIG. 2 is an elevated front view of the device illustrated in FIG. 1.
Figure 3:
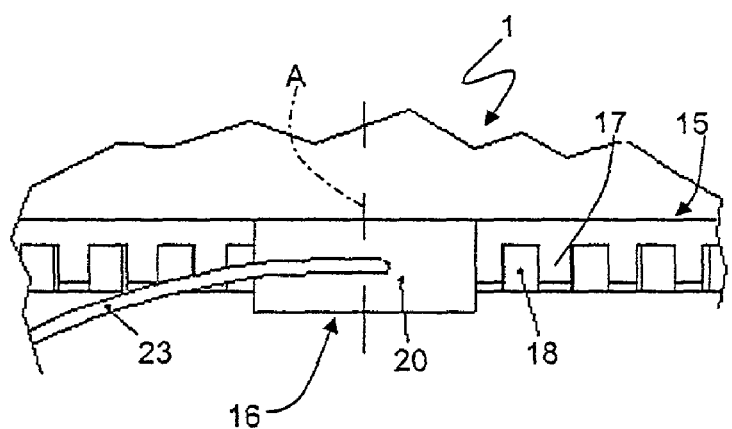
FIG. 3 is a view from above of the device illustrated in FIG. 1.
Figure 4:
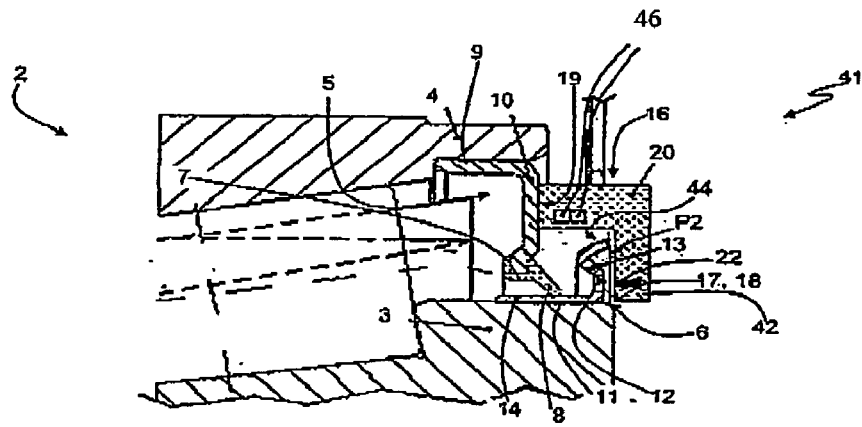
FIG. 4 is an axial section view, with some parts removed for reasons of clarity, of a second preferred form of embodiment of the device illustrated in FIG. 1.

As is illustrated in FIGS. 1, 2 and 3, the sensor 16 is mounted onto an external surface 19 of the wall 10, is physically separate from the shield 5, and comprises a main body 20 and two fixing screws 21 for fixing the body 20 to the wall 10 itself. As an alternative to the fixing screws 21, the sensor 16 can also comprise a rapid coupling system or any other element which is suitable for guaranteeing the rapid removal of the sensor 16 in the case of any damage or breakdown.

Figure 6:
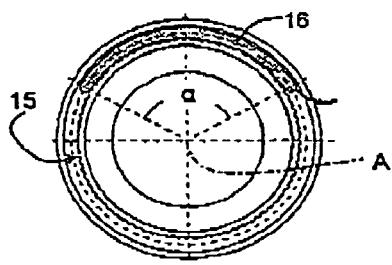
FIGS. 6 and 7 are front views, on a reduced scale, of respective possible configurations of the device illustrated in FIG. 1 and/or the device illustrated in FIG. 4.
Figure 7:
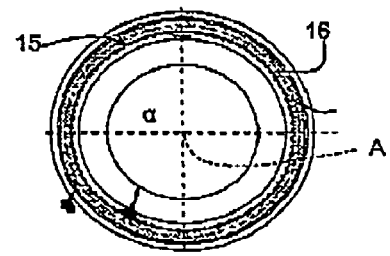
Figure 8:
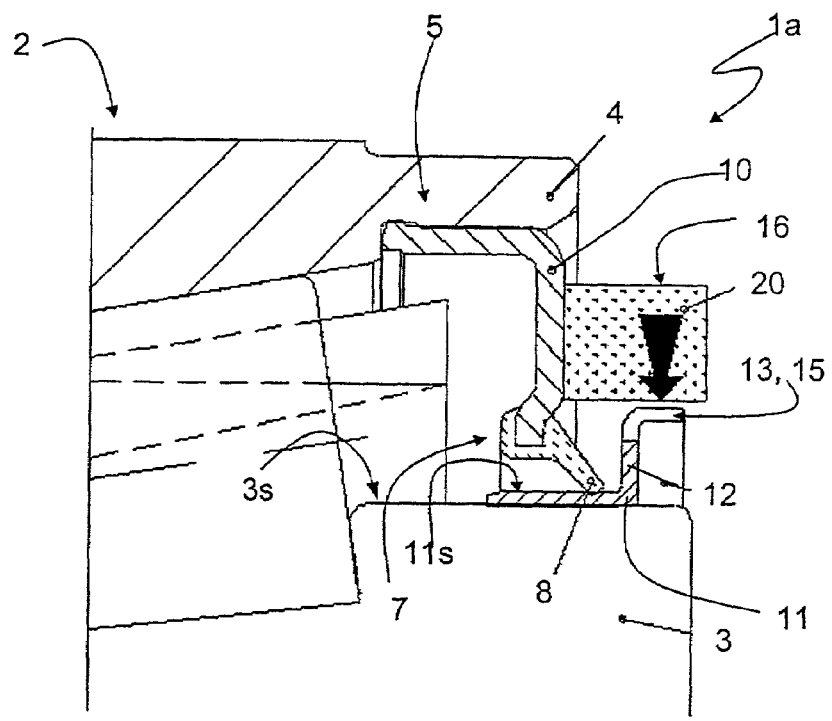
FIGS. 8-12 are axial section views, with some parts removed for reasons of clarity, of respective alternative preferred forms of embodiment of the device illustrated in FIG. 1.
Figure 9:
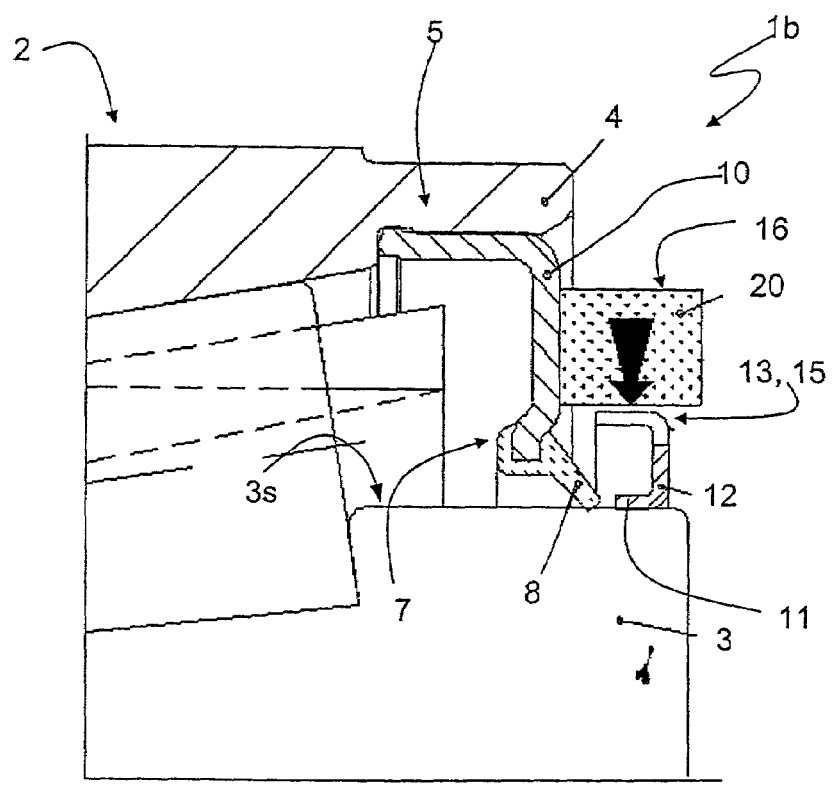
Figure 10:
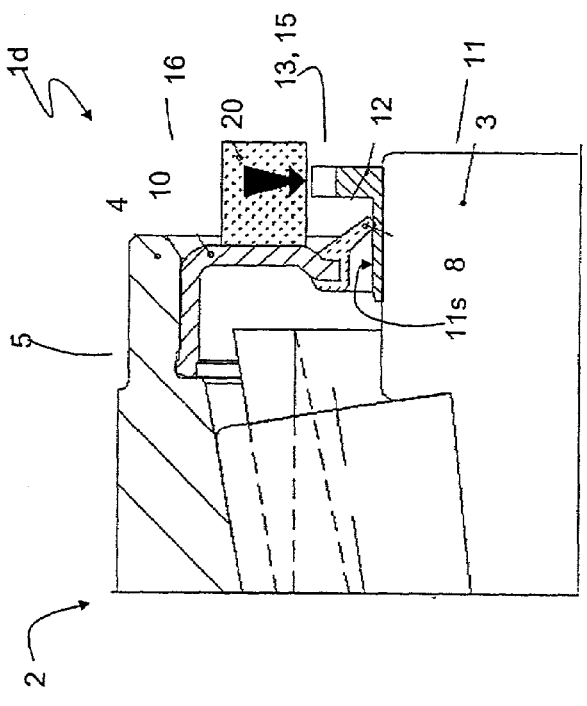
Figure 11:
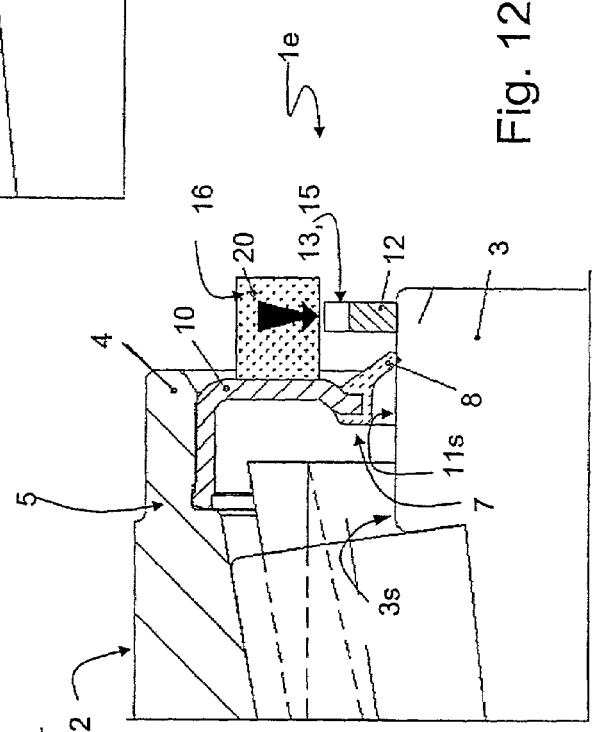
Figure 12:
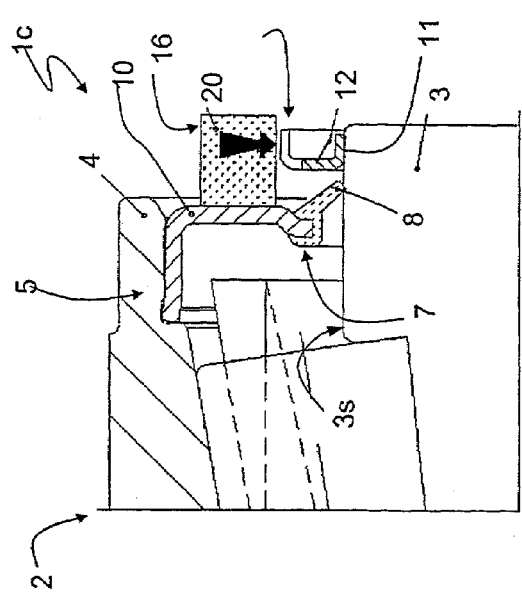

Furthermore, the sensor 16 comprises a connecting cable 23 which connects the sensor 16 itself to a peripheral decoding unit (of a well-known kind, which is not illustrated), and a sensitive element 22, which is arranged in a position facing the wall 13 on a cylindrical plane P1 which is coaxial to the rotation axis A and which, as is illustrated in FIGS. 6 and 7, extends around the axis A itself in a circumference arc which is of a determined width or which, alternatively, is equal to a circle.

The surveying device which has just been described is particularly suitable for being applied to a railway bearing 2 and, by simply inserting a number of analogous transducers 46 to the sensitive element 22 inside the sensor 16, it can also be used for surveying a number of different parameters such as, for example, the speed and direction of rotation, the temperature, vibrations, humidity or dampness, or the eventual presence of fumes or smoke. Furthermore, if the element 5 is produced as has been described above, it is possible to reduce production costs and it is also possible to use the sealing covering 7 by exploiting its well-known characteristics of sealing and efficiency.

The forms of embodiment which are illustrated in FIGS. 8, 9, 10, 11 and 12 relate, respectively, to a surveying device 1*a*, 1*b*, 1*c*, 1*d* and 1*e* which is analogous to the device 1, from which:

the device 1*a* differs from the device 1 due to the fact that, while the wall 13 still extends transversally to the wall 12, it is opposite the shield 5 and overlaps the surface 3*s* in an axial direction;

the device 1*b* differs from the device 1 due to the fact that the annular element 6 is not provided with a large part of the wall 11, and so the lip 8 is arranged in direct sliding contact with the surface 3*s* as well as with the surface 11*s;* the device 1*c* differs from the device 1 due to the fact that the wall 11 extends opposite the shield 5 leaving the lip 8 in direct sliding contact with the surface 3*s*, and also due to the fact that the wall 13 still extends transversally to the wall 12, but opposite the shield 5 and so overlapping the wall 11 in an axial direction;

the device 1*d* differs from the device 1 due to the fact that the wall 12 presents a thickness which is such as to completely incorporate the wall 13 inside one of its own external free radial ends: and the device 1*e* differs from the device 1 due to the fact that the wall 12 presents a thickness which is such as to completely incorporate the wall 13 inside one of its own free radial ends, and also due to the fact that there is no wall 11, so the lip 8 is arranged in direct sliding contact with the surface 3*s* and the element 6 is presented in its simplest form.

Figure 5:
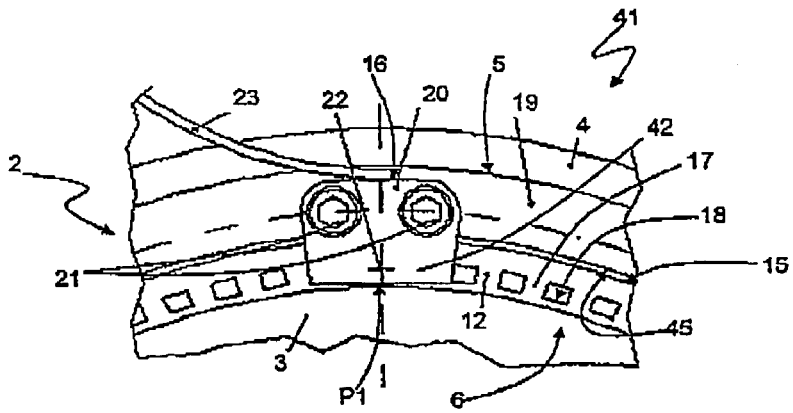
FIG. 5 is an elevated front view of the device illustrated in FIG. 4.

So, the body 20 of the sensor 16 presents an appendage 42, which is arranged transversally to the axis A, and which extends frontally to the wall 12. While the sensitive element 22 is supported by the appendage 42, it is arranged in a position which faces the wall 12 on an annular plane P2 which is transverse to the rotation axis A and, as is illustrated in FIGS. 5 and 6, it extends around the axis A itself in a circumference arc of a determined width or which, alternatively, is equal to a circle.

Furthermore, the device 41 differs from the device 1 due to the fact that the wall 13 no longer extends towards the shield 5, but, instead, it extends towards the outside of the railway bearing 2 in such a way as to define an external radial appendage 13 which is substantially in the shape of a truncated cone. The appendage 13 together with the body 20 of the sensor 16 creates a hollow space 44, which is provided with a window 45 which substantially faces the sensitive element 22.

The surveying device 41 which has just been described presents the same advantages as the device 1, to which should be added the centrifugal effect which results in the expulsion of any eventual detritus towards the hollow space 44 in dynamic conditions.

According to a form of embodiment which is not illustrated in the attached drawings, but which may be easily deduced in accordance with the above-written description, the sensor 16, instead of being physically separate from the shield 5, is incorporated into the shield 5 itself, and is defined by a body which is rendered integral with the second shield itself by means of cold pressing, or welding, resin finishing or moulding, or by means of other well-known techniques.

It is intended that the present invention should not be limited to the forms of embodiment which are herein described and illustrated, which are to be considered as examples of forms of embodiment of the surveying device for the running parameters of railway bearings, and which may be subject to further modifications in terms of the shape and disposition of the parts, as well as details pertaining to construction and assembly.

The invention claimed is:

1. Surveying device for the running parameters of a railway bearing, wherein said railway bearing is a tapered roller bearing including a rotating inner race having a rotational axis and a non-rotating outer race, the device comprising:

a sealing shield mounted on the non-rotating outer race;

a sealing covering integral with the shield and in contact with a sliding surface, wherein the sliding surface is integral with the rotating inner race;

an annular element-shrink-fit onto the rotating inner race and comprising an emission wall defining a signal generating element generating a signal, wherein the signal generating element is integral with the sliding surface wherein the end of the emission wall is oriented towards the shield and is arranged outside the shield and provided with alternating areas with mutually opposed signals;

a sensor on the outer race facing the signal generating element and reading the signal, wherein the sensor is integral with the shield and is positioned radially outward from and radially aligned with the signal generating element and outside the railway bearing wherein the railway bearings are tapered roller bearings.

2. Surveying device according to claim 1, wherein the generating element is defined by a phonic wheel provided with a plurality of full areas and a plurality of empty areas alternating in relation to each other.

3. Surveying device according to claim 2, wherein the emission wall is arranged coaxial to the rotational axis, is orientated towards the shield, and faces the sliding surface.

4. Surveying device according to claim 3, wherein the sliding surface is defined by a cylindrical wall of the annular element shrink fit onto the rotating race.

5. Surveying device according to claim 3, wherein the sliding surface is defined by the rotating race.

6. Surveying device according to claim 3, wherein the sensor comprises a sensitive element arranged in a position facing the phonic wheel on a surface coaxial to the rotational axis.

7. Surveying device according to claim 6, further comprising a plurality of transducers analogous to the sensitive element, wherein the transducers are arranged inside the sensor to survey specific typical quantities relating to each transducer.

8. Surveying device according to claim 2, wherein the emission wall is coaxially arranged in relation to the rotational axis and is orientated opposite the shield.

9. Surveying device according to claim 2, comprising an annular wall having a radial portion and forming part of the annular element and transversally arranged in relation to the rotational axis, wherein the emission wall is completely incorporated inside the radial portion of the annular wall.

10. Surveying device according to claim 2, wherein the emission wall is arranged transversally to the rotational axis.

11. Surveying device according to claim 10, wherein the annular element comprises an external radial appendage having a substantially truncated cone shape, wherein the external radial appendage and the sensor define a hollow space and wherein the hollow space presents a window facing the sensitive element.

12. Surveying device according to claim 1, wherein the generating element is defined by a phonic wheel provided with a plurality of positively magnetised areas and a plurality of negatively magnetised areas alternating in relation to each other.

13. Surveying device according to claim 1, wherein the sensor extends around the rotational axis in a circumference arc of a determined length.

14. Surveying device according to claim 13, wherein the length of the circumference arc is equal to a circle.

15. Surveying device according to claim 13, wherein the sensor is detachably fixable to the shield, and comprises fixing means to fix said sensor to the shield.

16. Surveying device according to claim 13, wherein the sensor is incorporated in the shield, and is defined by a body rendered integral with the shield by cold pressing, welding, resin finishing or molding.

17. Surveying device for the running parameters of railway bearing, wherein said railway bearing is a tapered bearing including a rotating race having a rotational axis and a non-rotating race the device comprising:
- a sealing shield mounted on the non-rotating race;
- a sealing covering integral with the shield and in contact with a sliding surface, wherein the sliding surface is integral with the rotating race;
- an emission wall defining a signal generating element integral with the sliding surface wherein the end of the emission wall is oriented towards the shield; and arranged outside the shield; and
- a sensor facing the signal generating element and reading the signal, wherein the sensor is directly mounted onto the shield in a position outside the shield and aligned radially outward from the signal generating element and outside the tapered roller railway bearing.

18. Surveying device according to claim 17, wherein the device further comprises an annular element shrink-fit onto the rotating race, wherein the annular element comprises an emission wall defining the signal generating element integral with the sliding surface and arranged outside the shield, and provided with alternating areas with mutually opposed signals.

19. Surveying device according to claim 17, wherein the generating element is defined by a phonic wheel provided with a plurality of full areas and a plurality of empty areas alternating in relation to each other.

20. Surveying device according to claim 19, wherein the emission wall is arranged coaxial to the rotational axis of the rotating race, is orientated towards the shield, and faces the sliding surface.

21. Surveying device according to claim 20, wherein the sliding surface is defined by a cylindrical wall of the annular element shrink fit onto the rotating race.

22. Surveying device according to claim 20, wherein the sliding surface is defined by the rotating race.

23. Surveying device according to claim 20, wherein the sensor comprises a sensitive element arranged in a position facing the phonic wheel on a surface coaxial to the rotational axis.

24. Surveying device according to claim 23, further comprising a plurality of transducers analogous to the sensitive element, wherein the transducers are arranged inside the sensor in order to survey specific typical quantities relating to each transducer.

25. Surveying device according to claim 19, wherein the emission wall is coaxially arranged in relation to the rotational axis of the rotating race and is orientated opposite the shield.

26. Surveying device according to claim 19, comprising an annular wall having a radial portion and forming part of the annular element and transversally arranged in relation to the rotational axis of the rotating race, wherein the emission wall is completely incorporated inside the radial portion of the annular wall.

27. Surveying device according to claim 19, wherein the emission wall is arranged transversally to the rotational axis of the rotating race.

28. Surveying device according to claim 27, wherein the annular element comprises an external radial appendage having a substantially truncated cone shape, wherein the external radial appendage and the sensor define a hollow space, and wherein the hollow space presents a window facing the sensitive element.

29. Surveying device according to claim 17, wherein the generating element is defined by a phonic wheel provided with a plurality of positively magnetized areas and a plurality of negatively magnetized areas alternating in relation to each other.

30. Surveying device according to claim 17, wherein the sensor extends around a rotational axis of the rotating race in a circumference arc of a determined length.

31. Surveying device according to claim 30, wherein the length of the circumference arc is equal to a circle.

32. Surveying device according to claim 30, wherein the sensor is detachably fixable to the shield, and comprises fixing means to fix the sensor to the shield.

33. Surveying device according to claim 30, wherein the sensor is incorporated in the shield, and is defined by a body rendered integral with the shield by cold pressing, welding, resin finishing or molding.

* * * * *